(12) United States Patent
Prugh et al.

(10) Patent No.: US 11,341,590 B1
(45) Date of Patent: May 24, 2022

(54) INTERMITTENT REMOTE PROPERTY CONTROL AND CONFIGURATION

(71) Applicant: Alarm.com Incorporated, Tysons, VA (US)

(72) Inventors: Alexander Prugh, Washington, DC (US); Alice Kuprenas, Tysons, VA (US); Eric Liao, Tysons, VA (US); Isaac Murakami, Tysons, VA (US); Johnathan Michael Carone, Mclean, VA (US); Kara Edman, Arlington, VA (US); Matthew Daniel Correnti, Newtown Square, PA (US)

(73) Assignee: Alarm.com Incorporated, Tysons, VA (US)

( * ) Notice: Subject to any disclaimer, the term of this patent is extended or adjusted under 35 U.S.C. 154(b) by 142 days.

(21) Appl. No.: 16/997,116

(22) Filed: Aug. 19, 2020

Related U.S. Application Data

(60) Provisional application No. 62/890,803, filed on Aug. 23, 2019.

(51) Int. Cl.
| | |
|---|---|
| *G06Q 50/16* | (2012.01) |
| *H04W 4/021* | (2018.01) |
| *G06Q 10/10* | (2012.01) |
| *G06Q 10/06* | (2012.01) |
| *G06Q 40/08* | (2012.01) |
| *G06N 20/00* | (2019.01) |
| *G06F 3/06* | (2006.01) |

(Continued)

(52) U.S. Cl.
CPC ......... *G06Q 50/163* (2013.01); *G05D 1/0022* (2013.01); *G06F 3/0604* (2013.01); *G06F 3/0653* (2013.01); *G06F 3/0679* (2013.01); *G06F 9/4411* (2013.01); *G06N 20/00* (2019.01); *G06Q 10/06312* (2013.01); *G06Q 10/1095* (2013.01); *G06Q 40/08* (2013.01); *G08G 1/133* (2013.01); *H04W 4/021* (2013.01)

(58) Field of Classification Search
CPC ....... H04L 12/28; H04L 67/025; H04L 41/18; H04L 41/28; G06Q 50/163; G06F 3/0653; H04W 4/021; G06N 20/00
See application file for complete search history.

(56) References Cited

U.S. PATENT DOCUMENTS

| | | |
|---|---|---|
| 8,014,789 B2 | 9/2011 | Breed |
| 8,350,694 B1 | 1/2013 | Trundle et al. |

(Continued)

*Primary Examiner* — El Hadji M Sall
(74) *Attorney, Agent, or Firm* — Fish & Richardson P.C.

(57) ABSTRACT

Methods, systems, and apparatus, including computer programs encoded on a storage device, are disclosed. A system performs operations including receiving sensor data from a sensor of a property monitored by a monitoring system, and based on the sensor data, determining a first event and a second event that have occurred at the property. The operations include determining that the monitoring system is not able to communicate with an outside network, and classifying the first event as a high priority event and the second event as a low priority event. The operations include determining that a mobile device is able to receive data from the monitoring system; and providing, to the mobile device, data indicating the first event and an instruction to transmit the data indicating the first event to a server upon the mobile device being able to communicate with the outside network.

20 Claims, 5 Drawing Sheets

(51) Int. Cl.
*G06F 9/4401* (2018.01)
*G05D 1/00* (2006.01)
*G08G 1/133* (2006.01)

(56) References Cited

U.S. PATENT DOCUMENTS

| | | | |
|---|---|---|---|
| 8,531,294 B2 * | 9/2013 | Slavin | G08B 13/2402 |
| | | | 340/568.1 |
| 8,862,092 B2 * | 10/2014 | Reitnour | H04L 67/28 |
| | | | 455/457 |
| 10,313,303 B2 * | 6/2019 | Baum | H04L 63/0209 |
| 10,405,070 B2 | 9/2019 | Schwarzkopf et al. | |
| 10,652,735 B2 * | 5/2020 | Li | H04L 67/125 |
| 2007/0256105 A1 * | 11/2007 | Tabe | H04N 21/23 |
| | | | 348/E7.086 |
| 2017/0257226 A1 * | 9/2017 | Bi | H04L 43/0817 |
| 2017/0263094 A1 * | 9/2017 | Slavin | G08B 13/2491 |

\* cited by examiner

INTERMITTENT REMOTE PROPERTY CONTROL AND CONFIGURATION

CROSS-REFERENCE TO RELATED APPLICATION

This application claims the benefit of U.S. Application No. 62/890,803, filed Aug. 23, 2019, which is incorporated by reference in its entirety.

TECHNICAL FIELD

This disclosure application relates generally to monitoring systems.

BACKGROUND

Many properties are equipped with property monitoring systems that include sensors and connected system components. Property monitoring systems typically require a consistent cellular or wireless broadband connection between the monitoring system control unit and a server system.

SUMMARY

Property monitoring systems typically require a consistent cellular or wireless broadband connection between the monitoring system control unit and a server system. The server system can be, for example, part of a network operations center. The server system may receive monitoring system data and determine system actions, such as generating alerts and notifications, based on the monitoring system data.

Some property monitoring systems may not have continuous access to a wireless broadband connection. For example, property monitoring systems may be installed in properties in remote locations, e.g., forests, mountains, or islands without reliable wireless broadband coverage. A property monitoring system that is able to operate in areas without a consistent wireless broadband connection would be beneficial for the property owners, managers, tenants, visitors, and guests of these remote properties.

While real-time communication between server systems and property monitoring systems of remote properties may not be possible, mobile computing devices may be leveraged for shuttling or conveying information to and from the remote properties. Properties in remote locations may have periodic visitors that come from areas with reliable coverage. Visitors may carry mobile electronic devices, e.g., smart phones, to the remote properties. The electronic devices may be used to carry information to and from the property monitoring systems of the remote properties using local communication protocols, e.g., Bluetooth communication. Shuttling information through visitors' electronic devices may enable the server system to analyze monitoring system data in a semi real-time or periodic manner. Shuttling information through visitors' electronic devices can reduce the number of visits that property owners need to make to remote properties.

Property monitoring systems may be installed in outdoor areas, e.g., parks or wildlife reservations. Outdoor property monitoring systems may include sensors dispersed throughout an outdoor area. Visitors may periodically carry electronic devices through the outdoor area, and pass within local communication range of the sensors. The visitors' electronic devices may be used to carry information to and from property monitoring systems of the outdoor areas.

Transmitting data from visitors' electronic devices may enable outdoor management personnel, e.g., park officials, to monitor data related to outdoor conditions and take appropriate actions in response to the data. By conveying data through visitors' electronic devices, the number of patrols required by park officials can be reduced, and the staffing of outdoor areas can be reduced.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
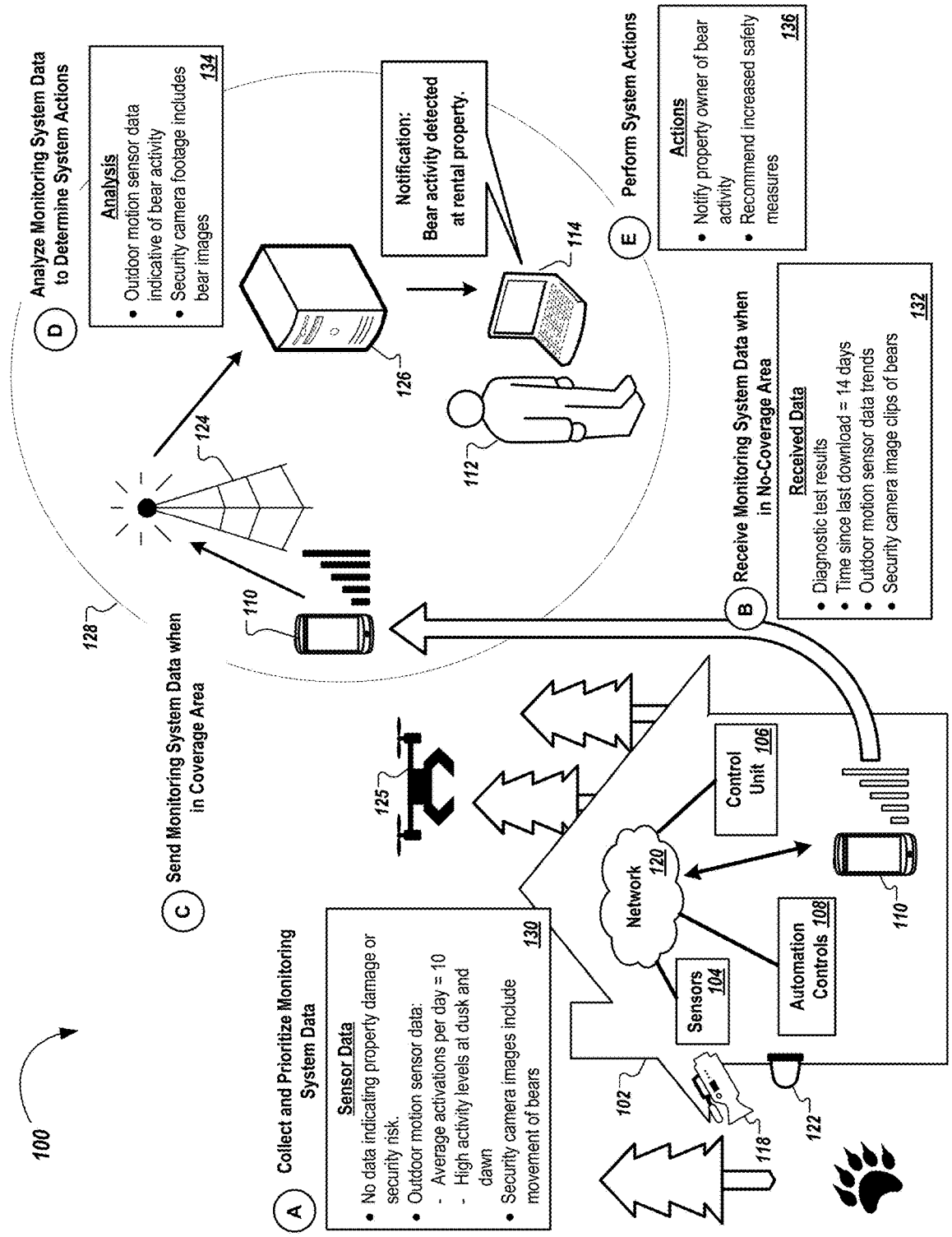
FIG. 1 is a diagram illustrating an example system for intermittent property monitoring.

FIG. 1 is a diagram illustrating an example system 100 for intermittent property monitoring. A property 102 is monitored by a monitoring system. The property 102 can be a home, another residence, a place of business, a public space, or another facility that is in a no-coverage area and is monitored by a monitoring system. A no-coverage area is an area that does not have access to a consistent wireless broadband connection. In the example in FIG. 1, the property 102 is a vacation rental property in a wooded area. The property 102 may be unoccupied during periods of time between rental reservations.

The property 102 does not have full time occupants. The property 102 typically has visitors for periods of several days or several weeks at a time. Visitors may be, for example, guests who reserve the property 102 for a vacation. The property 102 may be unoccupied for periods of time between rental reservations. The property 102 has a property owner 112. The property owner 112 can receive notifications and alerts regarding the property 102 via communication from a monitoring server 126 to an owner computing device 114.

The monitoring system at the property 102 includes a local network 120. The network 120 can be any communication infrastructure that supports the electronic exchange of data between a control unit 106 and other components of the monitoring system. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies.

The monitoring system includes one or more sensors 104 located at the property 102 that collect sensor data related to the property 102. The monitoring system has the ability to control various sensors 104 and other devices on the property 102 through automation controls 108.

An example sensor 104 at the property 102 is an outdoor security camera 118. The outdoor security camera 118 may be used to monitor for trespassers and wildlife near the property 102. In some implementations, the security camera 118 may perform video analysis on the images captured by the security camera 118. In some implementations, the security camera 118 may transmit images to the control unit 106, and the control unit 106 may perform video analysis on the images. The security camera 118 and/or the control unit 106 may perform video analysis on the images to detect and identify objects and/or perform facial recognition within the field of view of the security camera 118. For example, the security camera 118 may detect and identify animals, vehicles, and people. The security camera 118 may be able to identify and differentiate between small mammals, large mammals, and humans. The security camera 118 may also be able to differentiate between different mammals, e.g., between deer and bears. The security camera 118 may be able to differentiate between aggressive and passive actions of mammals. For example, an aggressive action may be a bear approaching the property 102 and attempting to break into an outdoor trash bin. A passive action may be a bear moving past the property 102 at a distance.

The security camera 118 may connect with an outdoor alarm 122. The outdoor alarm 122 may be configured to activate and produce an audible or visual alarm when trespassers and/or wildlife are detected by the security camera 118. For example, the outdoor alarm 122 can produce an audible alarm for the purpose of frightening passing wildlife, and for alerting occupants of the property 102 of the presence of wildlife near the property 102.

Other sensors 104 of the monitoring system collect various sensor data from the property 102. For example, the sensors 104 can include thermometers, cameras, microphones, smoke detectors, and water meters. The control unit 106 can collect and assess the data from the sensors 104 to monitor the conditions of the property 102 and detect any anomalies.

The control unit 106 can be, for example, a computer system or other electronic device configured to communicate with the sensors 104. The control unit 106 can also perform various management tasks and functions for the monitoring system. In some implementations, the owner 112, a visitor, or another user can communicate with the control unit 106 (e.g., input data, view settings, or adjust parameters) through a physical connection, such as a touch screen or keypad, through a voice interface, or over a network connection.

There may be periods of time when the property 102 is unoccupied. The property 102 may be unoccupied, for example, between the end of one rental reservation and the beginning of the next rental reservation. During time periods when the property 102 is unoccupied, the sensors 104 at the property 102 collect sensor data related to the property 102. The sensors 104 transmit the sensor data to the control unit 106 via the network 120.

Example sensor data can include indoor and outdoor motion sensor data, images and video analysis from the security camera 118, door and window open and shut data, smoke detector data, water usage data, electricity usage data, and gas usage data.

In some implementations, the control unit 106 can analyze some or all of the sensor data. For example, the control unit 106 can analyze outdoor motion sensor data to determine the number of motion sensor activations per day. The control unit 106 can correlate the outdoor motion sensor data with the security camera 118 data to identify a prominent cause of motion sensor activations. The control unit 106 can analyze door and window open and shut data to determine the number of times the doors and windows are open and shut per day. The control unit 106 can analyze water meter data to determine if there is an increase in water usage. The control unit 106 can analyze electricity usage data and gas usage data to determine if there are any anomalies in the usages.

The control unit 106 can sort, filter, and prioritize the sensor data. The control unit 106 can assign a priority for the data based on the urgency to communicate the data to the monitoring server 126. For example, the control unit 106 can assign a high priority for data that indicates conditions that may cause damage to the property 102. For example, a smoke detector activation may indicate a fire at the property 102. Thus, the control unit 106 may assign a high priority for smoke detector activation data. Similarly, an increase in water usage while the property 102 is unoccupied may indicate a water leak. Thus, the control unit 106 may assign a high priority for data indicating an increase in water usage. The control unit 106 may assign a lower priority for data that may indicate a security risk at the property 102, compared to the higher priority for damage risk. For example, data indicating that doors and windows are opened while the property 102 is unoccupied may indicate a security risk. The door and window data may receive a lower priority assignment compared to the smoke activation data.

In some implementations, the control unit 106 may prioritize the sensor data based on pre-programmed settings set by the installer or operator of the monitoring system. In some implementations, the control unit 106 may prioritize the sensor data based on input from the owner 112. For example, during a particular season of the year, the owner 112 may be concerned about bears near the property 102. The owner 112 may input a preference to the monitoring system that any data indicating the potential presence of bears receive a high priority assignment. The owner 112 may also input a preference to the monitoring system to assign a high priority to security camera 118 image that includes images of bears.

In another example, the owner 112 may be concerned with the security of the property 102, due to recent burglaries in the local area. The owner 112 may input a preference to the monitoring system that any data indicating potential security risks receive a high priority assignment. For example, the owner 112 may request to receive all data related to door and window openings at the property 102. The owner 112 may also request a high priority assignment for any security camera 118 image that includes images of people near the property 102.

In another example, the owner 112 may be concerned about water leaks at the property 102. The owner 112 may input a preference that any data indicating water usage while the property 102 is unoccupied receive a high priority assignment. The owner 112 may also set a rule or threshold, e.g., that any water usage over a certain number of gallons receive a high priority assignment.

In stage (A) of FIG. 1, the monitoring system collects and prioritizes monitoring system data 130. The monitoring system collects and prioritizes the monitoring system data 130 while the property 102, located in a no-coverage area, is unoccupied for a period of time. The period of time may be, for example, several days, weeks, or months. Prior to the unoccupied period of time, the owner 112 inputted a preference to the monitoring system to be notified of any bear activity near the property 102. The monitoring system collects data 130 from the sensors 104 during the unoccupied time period. The sensors 104 send the data 130 to the control unit 106 through the network 120. The control unit 106 receives the data 130 from the sensors 104. The control unit 106 may analyze, sort, filter, and/or prioritize the data, as described above.

The data 130 does not include any indications of property damage or security risk. For example, the water usage and smoke detector status are normal, and the doors and windows remain shut and locked. The data 130 does include indications of bear activity. For example, data from an outdoor motion sensor that is calibrated to detect large moving objects is activated ten times per day on average. The highest activity levels detected by the outdoor motion sensor occur at dusk at dawn, when bears are most likely to be active. Additionally, video analysis of security camera images indicates movement of large mammals near the property 102. Based on the owner 112 preferences, the control unit 106 assigns a high priority to the data 130 that indicates bear activity. The control unit 106 also selects and assigns a highest priority to security camera image clips that show images of bears. The control unit 106 may compress or encode the prioritized data to reduce the bandwidth required to support data transmission.

In stage (B) of FIG. 1, a mobile device receives monitoring system data while in the no-coverage area. For example, a visitor may bring a mobile device, e.g., a smart phone 110, to the property 102. The smart phone 110 is able to communicate electronically with the control unit 106 over the network 120. The mobile device can also be any type of data carrying computing device. For example, the mobile device can be a laptop computer, a tablet, smart watch, a video game console, or a smart car. When the smart phone 110 is within range of the network 120, the visitor may use the smart phone 110 as an electronic key to enter the property 102. The smart phone 110 then connects to the control unit 106 through the network 120.

In some implementations, more than one mobile device may communicate with the control unit 106. For example, a visitor or group of visitors may bring multiple mobile devices to the property 102. Each mobile device can connect with the control unit 106 through the network 120.

Once the smart phone 110 connects to the control unit 106, the smart phone receives data from the control unit 106. Received data 132 can include, for example, system diagnostic test results, the time since the last data download, and prioritized sensor data.

In some implementations, the electronic connection of the smart phone 110 to the control unit 106 prompts the control unit 106 to run one or more diagnostic tests on the monitoring system. For example, the control unit 106 may run diagnostic tests on the sensors 104 and automation controls 108. The diagnostic tests may assess the communication status between various devices, as well as the power and/or battery status of each device connected to the monitoring system. The results of the diagnostic tests are loaded to the smart phone 110.

The smart phone 110 may receive the highest priority monitoring system data that was collected during the unoccupied period of time. The control unit 106 determines to download the data to the smart phone 110 based on the priority of the data, and the data storage space available on the smart phone 110. The received data 132 includes that it has been 14 days since the last data download. The received data 132 also includes outdoor motion sensor data from the past 14 days, including the outdoor motion sensor trends that indicate bear activity. The received data 132 includes security camera image clips that include images of bears.

In some examples, there may be more than one mobile device connected to the network 120. The control unit 106 may determine to download certain data to the smart phone 110, and certain additional data to another mobile device. In some examples, there may be multiple short-term rental reservations scheduled at the property 102. The control unit 106 may determine to download certain data to the smart phone 110, and to wait to download certain additional data to a mobile device during an upcoming rental reservation. The control unit 106 may be programmed with a maximum size limit of data to download to any individual mobile device.

The control unit 106 may save any data that is not selected for download. For example, the control unit 106 may download certain security camera 118 image clips that include images of bears, and save other security camera 118 image clips. The control unit 106 can save the data for later retrieval by the owner 112 or a future visitor.

In some implementations, the monitoring system can include a drone 125, e.g., a flying drone. During extended unoccupied periods of time, e.g., multiple weeks or months, the drone 125 can be used to receive the data 132 from the monitoring system. The drone can be based at the property 102 or in a different location. If based in a different location, the drone 125 can transit to the property 102 such that the drone 125 is within the range of the network 120. The drone can receive the data 132 from the control unit 106 and then transit to a coverage area, e.g., the coverage area 128. In some examples, the drone 125 may collect data from more than one property in non-coverage areas before returning to the coverage area 128.

In some examples, the property 102 may have an upcoming rental reservation, and may be near another property that is expected to be unoccupied for multiple months. The drone 125 can transit to the unoccupied property and collect data from the unoccupied property. The drone 125 can then return to the property 102 and transmit the data to the control unit 106. When a visitor next brings a mobile device to the property 102, then property 102 can download the data related to the unoccupied property to the mobile device.

In some examples, mobile devices that pass within range of the network 120 may be able to receive monitoring system data from the property 102. For example, the control unit 106 may determine that certain information is urgent to communicate with the monitoring server 126. Urgent information may include, for example, a smoke detector activation, a burglar alarm activation, or indications of a major pipe leak. The control unit 106 can search for mobile devices passing near the property 102 that may be able to convey the urgent information to the monitoring server 126. The control unit 106 can send a request to the passing mobile device to receive the urgent information. If the owner of the mobile device accepts the request, the control unit 106 can send the urgent information to the passing mobile device.

In stage (C) of FIG. 1, the smart phone 110 sends the monitoring system data 132 to a monitoring server 126 when the smart phone 110 is in the coverage area 128. For example, the visitor may depart the property 102 and bring the smart phone 110 into the coverage area 128. The visitor may bring the smart phone 110 into the coverage area 128, for example, at the completion of the visitor's rental reservation at the property 102. In another example, the visitor may bring the smart phone 110 into the coverage area 128 during the rental reservation, e.g., if the visitor leaves the property 102 temporarily to enter a town or city that is in the coverage area 128. The coverage area 128 is an area that has access to consistent cellular and/or wireless broadband signals. For example, the coverage area 128 may be an area defined by the range of one or more cellular towers 124. When in the coverage area 128, the smart phone 110 sends the received data 132 to the monitoring server 126 via the cellular tower 124.

The monitoring server 126 may be, for example, one or more computer systems, server systems, or other computing devices that are located remotely from the property 102 and that are configured to process information related to the monitoring system at the property 102. In some implementations, the monitoring server 126 is a cloud computing platform.

The smart phone 110 communicates with the monitoring server 126 via a long-range data link. The long-range data link can include any combination of wired and wireless data networks. For example, the smart phone 110 can exchange information with the monitoring server 126 through a wide-area-network (WAN), a broadband internet connection, a cellular telephony network, a wireless data network, a cable connection, a digital subscriber line (DSL), a satellite connection, or other electronic means for data transmission. In some implementations, the long-range data link between the smart phone 110 and the monitoring server 126 is a secure data link (e.g., a virtual private network) such that the data exchanged between the smart phone 110 and the monitoring server 126 is encoded to protect against interception by an adverse third party.

In stage (D) of FIG. 1, the monitoring server 126 analyzes 134 the monitoring system data 132 to determine system actions. The monitoring server 126 analyzes 134 the data 132 received from the smart phone 110, including the diagnostic test results, the motion sensor data trends, and the security camera 118 images. The monitoring server 126 determines that the data 132 indicates bear activity at the property 102. The monitoring server 126 can determine system actions based on pre-programmed settings and rules. For example, a rule may state that the owner 112 is notified of any indication of bears at the property 102.

Based on the diagnostic test results, the monitoring server 126 can send notifications to the owner 112 regarding any monitoring system equipment issues. The owner 112 may then take action to address any developing issues in the monitoring system, e.g., low batteries, damaged devices, or local communication issues.

In some examples, the monitoring server 126 can determine system actions that include adjusting or configuring a device at the property 102. For example, the alarm 122 may normally be in an "off" state, so that the alarm 122 does not activate unnecessarily. The monitoring server 126 may be programmed with a rule that states that if the monitoring system data 132 includes any indications of bears near the property 102, the alarm 122 should be switched to an "automatic" state. In an "automatic" state, the alarm 122 automatically activates when the security camera 118 detects a large mammal near the property 102. In some examples, the monitoring server 126 may be programmed to request permission from the owner 112 before adjusting a device at the property 102.

In stage (E) of FIG. 1, the monitoring server 126 performs system actions 136. The system actions 136 include notifying the owner 112 of the bear activity at the property 102. The monitoring server 126 can send the notification to the owner 112 via, for example, an email that the owner can receive on the computing device 114. The monitoring server 126 can also send the notification to the owner 112 via, for example, a text message or telephone call.

The monitoring server 126 sends the notification of bear activity to the owner 112, and sends recommendations for increased safety measures at the property 102. Recommendations for increased safety measures may include, for example, switching the alarm 122 to an "automatic" state, and sending daily reminders to the visitors of the property 102 to lock the outdoor trash bin. Other recommendations may include posting warning signs at the property 102, or canceling upcoming rental reservations.

In some examples, the owner 112 may request a status update from the monitoring server 126 each time a visitor's mobile device sends monitoring system data 132 to the monitoring server 126. For example, the owner 112 may input a request to be notified of the bear activity level, whether the monitoring system data 132 indicates high bear activity or low bear activity. If bear sightings are low, the owner does not need to take special precautions for renters.

The owner 112 may request specific information from the property 102 via the monitoring server 126. For example, the owner 112 may receive a high electric bill in a particular month. The owner 112 can send a request to the monitoring server 126 that, following the end of the next rental reservation, the monitoring server 126 send the owner 112 all data that may affect the electric bill. Following the end of the next rental reservation, the monitoring server 126 may collect and send to the owner 112 data related to window and door open/shut status, thermostat settings, lighting usage, and appliance usage. The owner 112 can determine to take action based on the data. For example, if the owner 112 determines that visitors are running the air conditioner with the windows open, the owner 112 can program the control unit 106 to automatically shut the windows when the air conditioner is on, or to automatically shut off the air conditioner if a window is open. The owner 112 may also establish a thermostat override, so that visitors cannot adjust thermostat settings at the property 102.

Though described above as being performed by a particular component of system 100 (e.g., the control unit 106 or the monitoring server 126), any of the various control, processing, and analysis operations can be performed by either the control unit 106, the monitoring server 126, or another computer system of the system 100. For example, the control unit 106, the monitoring server 126, or another computer system can analyze the data from the sensors 104 to determine the actions 136. Similarly, the control unit 106, the monitoring server 126, or another computer system can control the various sensors 104, and/or the property automation controls 108, to collect data or control device operation.

Figure 2:
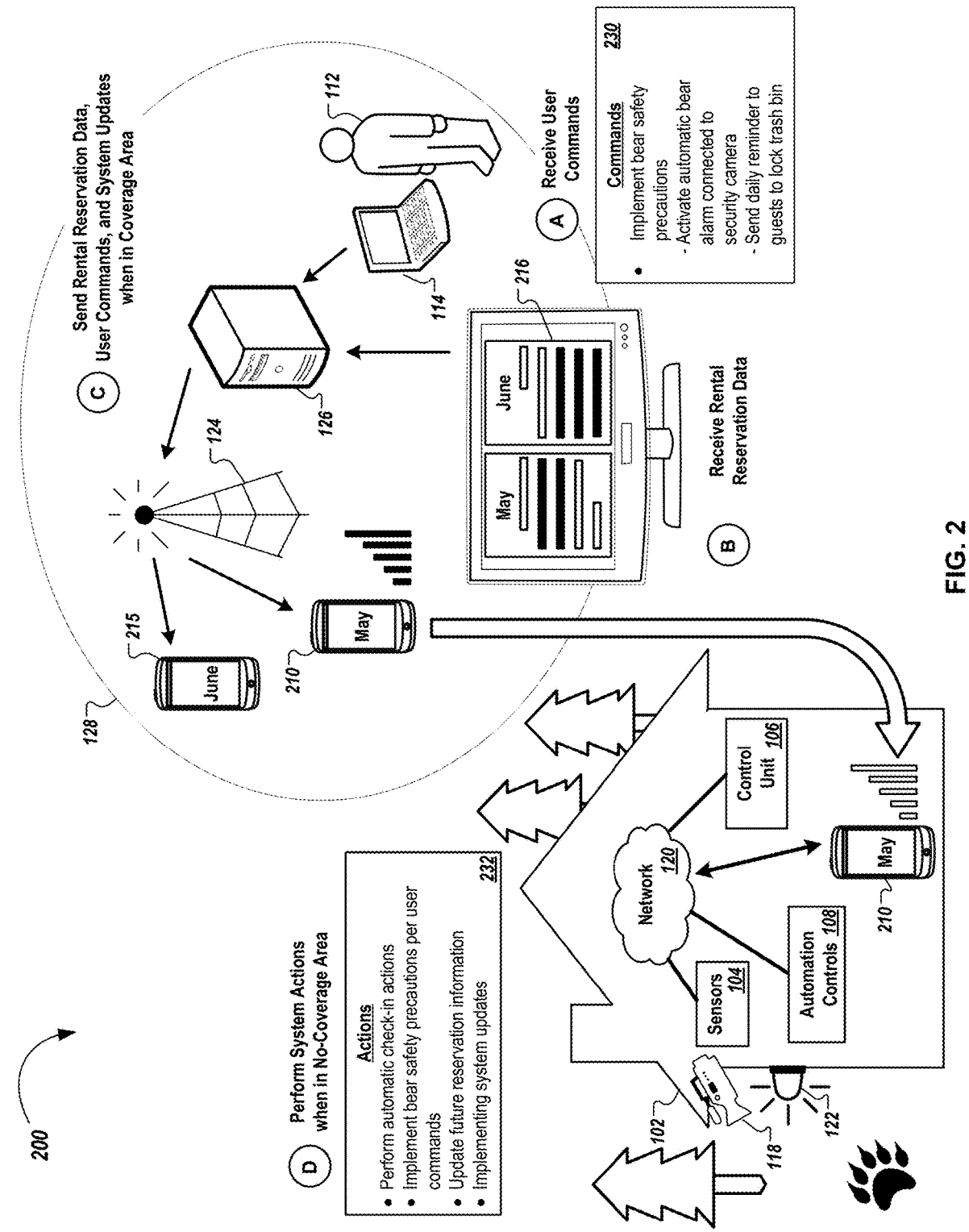
FIG. 2 is a diagram illustrating an example system for intermittent property control and configuration.

FIG. 2 is a diagram illustrating an example system 200 for intermittent property control and configuration. The system 200 includes some components that are the same as the components in the system 100. The property 102 is a vacation rental property in a remote wooded area, and is monitored by a monitoring system. The property 102 is in a no-coverage area. The property 102 has an owner 112. The property owner 112 can send commands through an owner computing device 114 to control and configure the property 102 via communication through a monitoring server 126.

As described in reference to FIG. 1, the owner 112 may receive notifications and information related to the property 102 from the monitoring server 126. The notifications may include recommendations to take actions to correct or mitigate adverse conditions at the property 102. In response to receiving a notification from the monitoring server 126, the owner 112 may take one or more actions. Actions can include notifying authorities, visiting the property 102 to correct an adverse condition, or sending a command to the monitoring server 126 to control or configure one or more devices at the property 102.

In stage (A) of FIG. 2, the monitoring server 126 receives user commands 230. In response to receiving a notification about bear activity from the monitoring server 126, the owner 112 may input one or more user commands 230 through the owner computing device 114 to the monitoring server 126. For example, the owner 112 may send commands 230 to implement bear safety precautions at the property 102. Bear safety precautions may include, for example, activating an automatic alarm connected to the security camera 118, and sending a daily reminder to guests of the property 102 to lock the outdoor trash bin.

In stage (B) of FIG. 2, the monitoring server 126 receives rental reservation data 216. The rental reservation data 216 may include data related to upcoming rental reservations at the property 102. The rental reservation data 216 can include the scheduled arrival dates and times, and departure dates and times, of visitors. The rental reservation data 216 can also include the number of visitors per rental reservation, the ages of the visitors, and contact information for the visitors. The monitoring server 126 can receive the rental reservation data 216, for example, from a vacation rental management website or software application.

Stages (A) and (B) of FIG. 2 are independent from one another and can occur at the same time or at different times. In some examples, the monitoring server 126 receives both the user commands 230 and the rental reservation data 216. In some examples, the monitoring server 126 receives only one of the user commands 230 or the rental reservation data 216. The monitoring server 126 may receive rental reservation data 216 for multiple properties. For example, the monitoring server 126 may receive rental reservation data 216 for the property 102 and one or more neighboring properties.

In stage (C) of FIG. 2, the monitoring server 126 sends information including the rental reservation data 216, the user commands 230, and/or system updates to visitor mobile devices, e.g., smart phones 210, 215, while the smart phones 210, 215 are in a coverage area. The monitoring server 126 sends the information to the smart phones 210, 215 via the cellular tower 124. The smart phone 210 belongs to a visitor who has a rental reservation during the month of May, e.g., the May visitor, while the smart phone 215 belongs to a visitor who has a rental reservation during the month of June, e.g., the June visitor.

The May visitor and the June visitor connect the smart phones 210, 215 to the monitoring server 126 during a rental confirmation process. For example, the monitoring server 126 may send a text message to the smart phone 210 with a website link to confirm the rental reservation for May. The May visitor may select the link to confirm the reservation. The May visitor may download an application to the smart phone 210 that can be used to access the property 102 and to communicate with the monitoring server 126 regarding the rental reservation. The May visitor may register additional mobile devices to the rental reservation through the application. For example, the May visitor may register his or her smart car or smart watch to the rental reservation through the application. The May visitor may also register the mobile devices of other visitors to the rental reservation, e.g., family members who will be visiting the property 102 at the same time.

When the smart phones 210, 215 connect to the monitoring server 126, the monitoring server 126 can send information to the smart phones 210, 215 for conveyance to the property 102. For example, the monitoring server 126 can send the rental reservation data 216, the user commands 230, and system updates to the smart phones 210, 215. System updates may be, for example, software updates for the control unit 106. The rental reservation data 216 can include the rental reservation data 216 for the upcoming rental reservation, as well as future reservations. For example, the monitoring server 126 may send the rental reservation data for both May and June to the smart phone 210. The monitoring server 126 may send the rental reservation data for June and July to the smart phone 215. In some examples, the monitoring server 126 can be pre-programmed to send rental reservation data 216 for a specific period of time, e.g., one month or two months. In some examples, the monitoring server 126 can send rental reservation data 216 based on the amount of data storage required and the space available on the smart phones 210, 215. For example, if the monitoring server 126 sends a system update and user commands 230 to the smart phone 210, the monitoring server 126 may determine to send rental reservation data for only one month instead of two or three months, based on the data storage space available on the smart phone 210.

In some examples, the monitoring server 126 may send information to the smart phones 210, 215 a pre-determined amount of time before the start of the rental reservation. For example, the monitoring server 126 may send the information to the smart phones 210, 215 the day before the start of the rental reservation. In some examples, the monitoring server 126 may send the information to the smart phones 210, 215 based on the global positioning system (GPS) locations of the smart phones 210, 215. For example, the monitoring server 126 may track the GPS location of the smart phone 210 to determine when the smart phone 210 is leaving the coverage area 128 en route to the property 102. The monitoring server 126 can send the information to the smart phone 210 immediately prior to the smart phone 210 exiting the coverage area 128, in order to ensure the smart phone 210 receives the most up-to-date information.

In stage (D) of FIG. 2, the monitoring system performs actions 232 based on the data conveyed by the smart phone 210. The May visitor brings the smart phone 210 to the property 102 in the no-coverage area. The May visitor uses the smart phone 210 to electronically access the property 102. The smart phone 210 communicates electronically with the control unit 106 over the network 120. The smart phone 210 uploads data to the control unit 106, including the user commands 230, the system updates, and the rental reservation data 216. The monitoring system performs actions 232 of implementing the bear safety precautions in accordance with the user commands 230. For example, the monitoring system uses automation controls to switch the alarm 122 to an "automatic" status, so that the alarm 122 will activate when the security camera 118 detects the presence of bears. The monitoring system also implements the bear safety precaution of sending a daily reminder to the visitors to lock the outdoor trash bin.

The monitoring system performs actions 232 of updating future rental reservation information stored in the control unit 106. The monitoring system also performs automatic check-in actions for the May visitor. Automatic check-in actions can include, for example, using automation controls 208 to adjust heat and lighting, and to open water valves, at the property 102. Automatic check-in actions can also include adjusting sensor 204 settings based on the occupancy of the property 102. For example, water usage is expected to increase with a greater numbers of occupants. Therefore, the control unit 106 can adjust the settings on the water meter sensor to raise the baseline expected water usage level according to the number of visitors. This prevents the monitoring system from detecting an anomaly due to a large increase in water usage during the rental reservation.

The control unit 106 receives the rental reservation data 216 uploaded from the smart phone 210. The rental reservation data 216 includes details regarding the May rental reservation, the June rental reservation, and possibly other future rental reservations. The control unit 106 can use the rental reservation data 216 to determine when to reconfigure components of the property 102. For example, the owner 112 may have a setting that the heat is set to 60 degrees Fahrenheit (F) while the property is unoccupied, and to 68 degrees F. when the property is occupied. The owner 112 may program the control unit 106 to raise the heat from 60 degrees F. to 68 degrees F. the day before the start of each rental reservation. The control unit 106 can automatically adjust the heat setting on the appropriate day, based on the rental reservation data 216. Similarly, the owner 112 may program the control unit 106 to shut the main water valve to the property 102 the day after the end of a rental reservation, and to open the water valve the day prior to the following rental reservation. The control unit 106 can also reconfigure security settings between rental reservations, e.g., the control unit 106 can be programmed to change an entry passcode to the property 102 the day after the end of a rental reservation.

In some examples, the control unit 106 can configure components of the monitoring system based on external data uploaded from the smart phone 110. For example, the smart phone 110 may upload data to the control unit 106 regarding a storm warning from a weather service. The control unit 106 can reconfigure components of the monitoring system to pre-programmed storm settings. For example, the control unit 106 may shut all windows and/or adjust the thermostat in preparation for a storm. The control unit 106 can update the stored storm-related information when additional data is uploaded from a mobile device. For example, the day of a storm warning, the May visitor may bring the smart phone 210 into a coverage area 128 while shopping for supplies. While in the coverage area 128, the smart phone 210 can receive updated information regarding the speed and track of the storm. When the smart phone 210 returns to the property 102, the control unit 106 can receive the updated information from the smart phone 210, and can configure components of the monitoring system accordingly. The data uploaded to the control unit 106 can include a timestamp, so that the control unit 106 can determine system actions based on the latest available data.

In some examples, the monitoring system may perform a system action based on not receiving an update from the smart phone 110. For example, the water meter may detect an increase in water usage at the property 102. The control unit 106 may determine that the increased water usage indicates a leak in a pipe at the property 102. During a rental reservation, the control unit 106 may send the water usage data indicating the leaky pipe to the smart phone 210. Following the rental reservation, the smart phone 210 might not enter a coverage area 128 for an extended period of time, and therefore might not upload the water usage data to the monitoring server 126. The control unit 106 may determine to shut the main water valve to the property 102 without receiving a command from the owner 112 within a pre-programmed period of time. The pre-programmed period of time can depend on the severity of the problem. For example, if the water usage data indicates a small pipe leak, the control unit 106 may wait several days before taking automatic action without a command from the owner 112. However, if the water usage data indicates a larger pipe leak, the control unit 106 may take automatic action within a shorter amount of time, e.g., several minutes or hours.

In some examples, data that is received by a smart phone 210 may not be sent to the monitoring server 126. For example, the smart phone 210 may be damaged or discarded before entering the coverage area 128. The monitoring server 126 can determine if it does not receive data as expected from the smart phone 210. For example, following the end of a rental reservation, the monitoring server 126 expects to receive data from the smart phone 210 within a day. If the monitoring server 126 does not receive the data from the smart phone 210 within a day, the monitoring server 126 may request that the smart phone 215 for the next reservation receive and send data for a longer time period. For example, the property 102 may be unoccupied in the month of April. The May visitor's smart phone 210 receives the data collected by the control unit 106 during April. After the May reservation ends, the monitoring server 126 does not receive the April data. Prior to the start of the June rental reservation, the monitoring server 126 can send a request to the smart phone 215 to receive data from the control unit 106 for both April and May.

Figure 3:
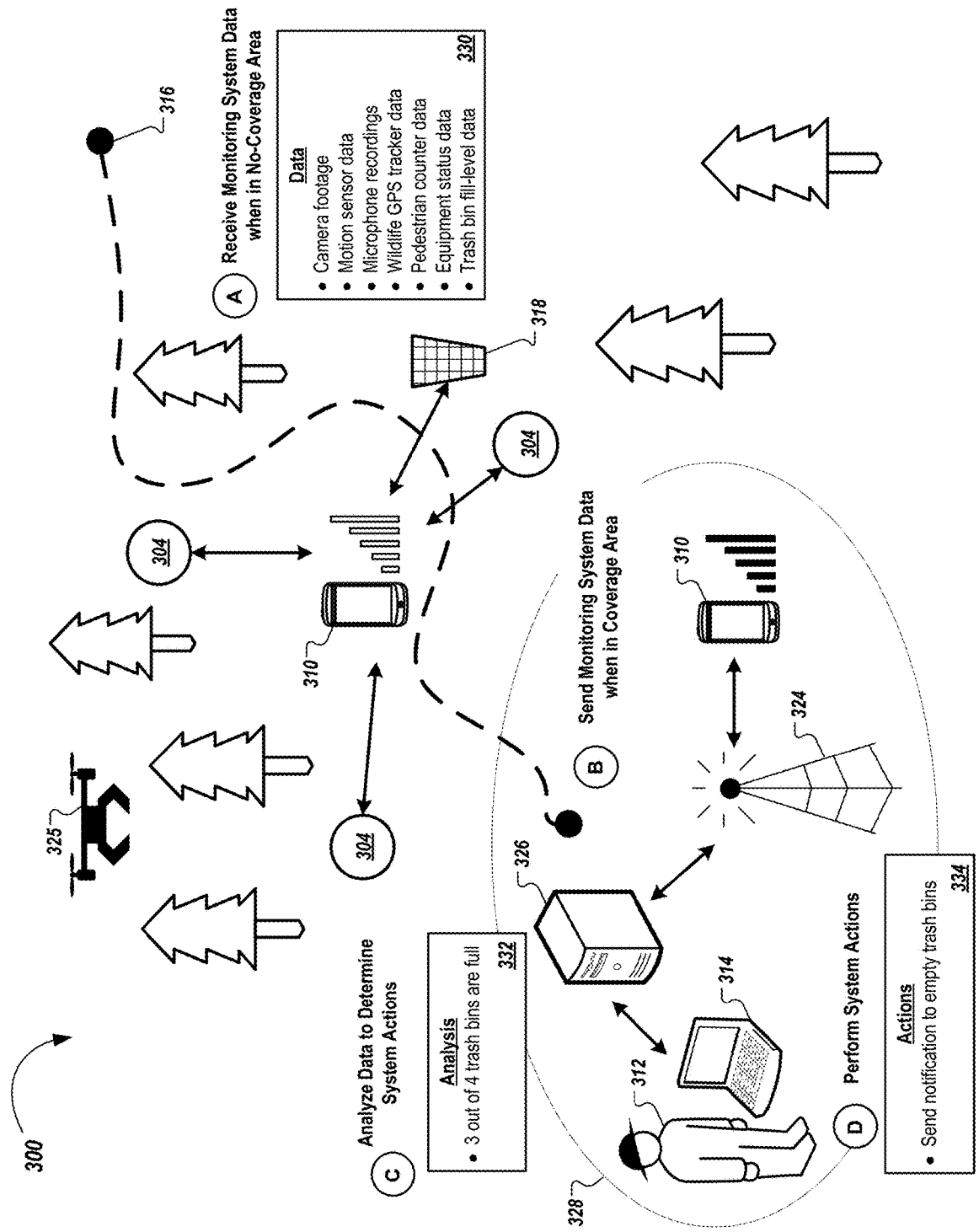
FIG. 3 is a diagram illustrating an example system for intermittent outdoor property monitoring and control.

FIG. 3 is a diagram illustrating an example system 300 for intermittent outdoor property monitoring and control. The system 300 is located in an outdoor area, e.g., a park. A region of the park is in a coverage area 328, which may be defined by the range of one or more cellular towers 324. The remainder of the park is in a no-coverage area. The park is monitored by a monitoring system. The park has one or more employees, e.g., park rangers 312. The park rangers 312 are responsible for the upkeep and maintenance of the park, as well as the safety of visitors to the park. The park rangers 312 can receive notifications and alerts regarding the park via communication from a server 326 to a computing device 314.

The monitoring system includes one or more sensors 304 located throughout the park. The sensors 304 can communicate with nearby computing devices, e.g., through a Bluetooth connection. The sensors 304 may be installed at locations in the park that are near well-traveled areas in the park, e.g., near one or more trails 316. The sensors 304 collect various data from throughout the park. The sensors 304 can include, for example, video cameras with video analysis capabilities, motion sensors, microphones, wildlife GPS tracking receivers, pedestrian counters, and trash bin fill-level sensors.

The park typically has visitors who may hike or camp at the park. In some examples, a visitor may enter the park through the coverage area 328. The visitor may bring a mobile device into the coverage area 328. The mobile device can be any type of data carrying computing device. For example, the mobile device can be a laptop computer, a tablet, smart watch, or a hand-held video game console. While in the coverage area 328, a visitor may download an application to the mobile device, e.g., a smart phone 310, for communicating with the monitoring system while at the park. The application can enable the smart phone 310 to receive notifications related to conditions at the park, e.g., weather conditions and wildlife activity levels. The application can also enable the smart phone 310 to receive data from the sensors 304 throughout the park. The visitor may depart the coverage area 328 to follow the trail 316 through the park.

In stage (A) of FIG. 3, the smart phone 310 receives monitoring system data 330 while in the no-coverage area. The smart phone 310 can receive the monitoring system data 330, for example, if the smart phone 310 includes the application for the park. In some examples, e.g., if the smart phone 310 does not include the application for the park, the smart phone 310 may receive a request from the sensors 304 to allow the smart phone 310 to receive the data 330.

The data 330 can include, for example, camera images from video cameras, motion sensor data, microphone recordings, and wildlife GPS tracker data. The data 330 can also include pedestrian counter data indicating the number of pedestrians who have passed by a pedestrian counter, and equipment status data including the power levels and connectivity levels of components of the monitoring system. The data 330 can include trash bin fill-level data that indicates the fill levels of one or more trash bins 318 in the park.

In some implementations, the monitoring system can include a drone 325, e.g., a flying drone. The drone 325 can be used to collect the data 330 from the monitoring system. The drone may be based, for example, at the park headquarters or visitor center. The drone 325 can transit throughout the park such that the drone 325 passes within the range of the sensors 304. The drone can receive the data 330 from the sensors 304 and then transit to the coverage area 328. In some examples, the drone 325 can be used to collect data from the sensors 304 that visitors pass infrequently. In some examples, the drone 325 can be used to collect data from the sensors 304 during certain times of the year when the number of visitors is low.

In stage (B) of FIG. 3, the smart phone 310 sends the data 330 to the monitoring server 326 when the smart phone 310 is in the coverage area. For example, the visitor may depart the no-coverage area and bring the smart phone 310 into the coverage area 328 at the completion of the visitor's hike or camping trip. When in the coverage area 328, the smart phone 310 sends the data 330 to the monitoring server 326 via the cellular tower 324.

The server 326 may be, for example, one or more computer systems, server systems, or other computing devices that are located remotely from the park and that are configured to process information related to the monitoring system at the park. In some implementations, the monitoring server 326 is a cloud computing platform.

In stage (C) of FIG. 3, the monitoring server 326 analyzes 332 the monitoring system data 330 received from the smart phone 310. The monitoring server 326 analyzes 332 the data 330 including the trash bin fill-level data. The monitoring server 326 determines that the data 330 indicates that three out of four of the trash bins 318 in the park are full. The monitoring server 326 may determine the system actions based on pre-programmed settings and rules. For example, a rule may state that the park rangers 312 are notified when any single trash bin 318 is full. In another example, a rule may state that the park rangers 312 are notified when more than half of the trash bins 318 are full.

In stage (D) of FIG. 3, the monitoring server 326 performs system actions 334. The system actions 334 include notifying the park rangers 312 of the full trash bins 318 in the park. The monitoring server 326 can send the notification to the park rangers 312 via, for example, an email that the park rangers 312 can receive on a computing device 314. The monitoring server 326 can also send the notification to the park rangers 312 via, for example, a text message or telephone call. The park rangers 312 may then take action to address any developing issues in the park. For example, the park rangers 312 can send park employees to empty the trash bins 318.

Figure 4:
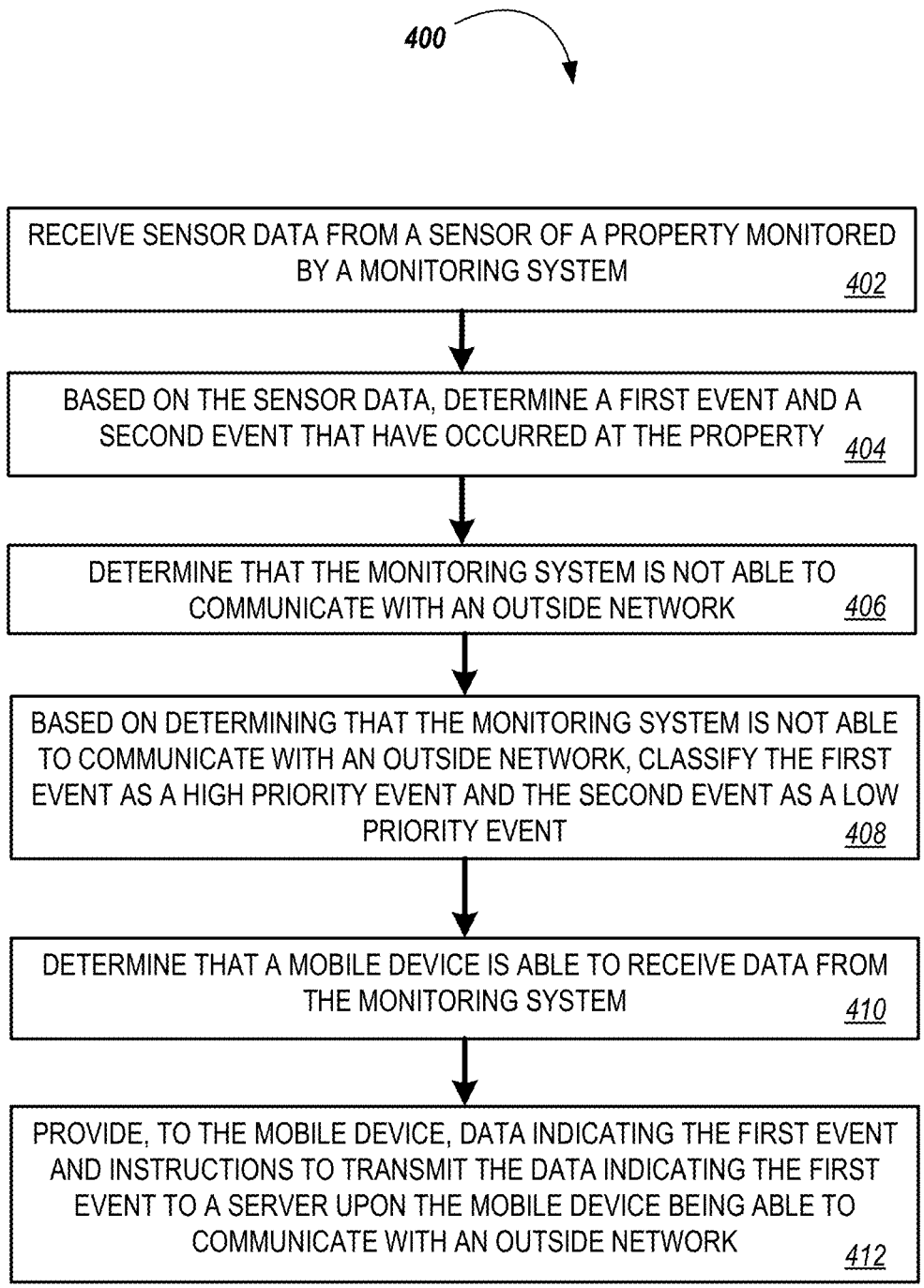
FIG. 4 is a flow chart illustrating an example of a method for property control and configuration based on intermittent property monitoring.

FIG. 4 is a flow chart illustrating an example of a process 400 for property control and configuration based on intermittent property monitoring. Process 400 can be performed by one or more computer systems, for example, the monitoring server 126 of system 100 and system 200. In some implementations, some or all of the process can be performed by the control unit 106 of the system 100, or by another computer system located at the monitored property.

Briefly, process 400 includes receiving sensor data from a sensor of a property monitored by a monitoring system (402), based on the sensor data, determining a first event and a second event that have occurred at the property (404), determining that the monitoring system is not able to communicate with an outside network (406), and based on determining that the monitoring system is not able to communicate with an outside network, classifying the first event as a high priority event and the second event as a low priority event (408). The process 400 also includes determining that a mobile device is able to receive data from the monitoring system (410), and providing, to the mobile device, data indicating the first event and instructions to transmit the data indicating the first event to a server upon the mobile device being able to communicate with an outside network (412).

In more detail, the process 400 includes receiving sensor data from a sensor of a property monitored by a monitoring system (402). The sensor can be one of the sensors 104 of the property 102. The sensor can be, for example, a thermometer, a camera, a motion sensor, a microphone, a smoke detector, a door or window sensor, or an electricity meter. The sensor data can include, for example, temperature data, camera images and video analysis data, indoor or outdoor motion sensor data, audio data, smoke detector data, door or window open and shut data, or electricity usage data.

The process 400 includes, based on the sensor data, determining a first event and a second event that have occurred at the property (404). For example, sensor data from a smoke detector can include the activation of the smoke detector at the property. Sensor data from an electricity meter can include electricity usage data indicating a recent increase in electricity usage at the property. The monitoring system can determine the first event to be a possible fire occurring at the property, based on the smoke detector data. The monitoring system can determine the second event to be an increase in electricity usage at the property, based on the electricity meter data.

The process 400 includes determining that the property is not able to communicate with an outside network (406). For example, the property may be located in a remote location, e.g., a forest, mountain, or island. The property, e.g., the property 102, may be in a no-coverage area that does not have access to a consistent wireless broadband connection. The outside network can be, for example, a broadband or cellular network.

The process 400 includes, based on determining that the property is not able to communicate with an outside network, classifying the first event as a high priority event and the second event as a low priority event (408). Classifying the first event as a high priority event and the second event as a low priority event can include determining that a risk of damage to the property associated with the first event is greater than the risk of damage to the property associated with the second event. Based on determining that the risk of damage to the property associated with the first event is greater than the risk of damage to the property associated with the second event, the system can classify the first event as a high priority event and the second event as a low priority event. For example, the first event may be a fire alarm activating, and the second event may be the windows remaining open while the property is unoccupied. The system can determine that the risk of damage to the property associated with the fire alarm activating is greater than the risk of damage to the property associated with the windows remaining open. Based on determining that the risk of damage to the property associated with the fire alarm activating is greater than the risk of damage to the property associated with the windows remaining open, the system may classify the fire alarm activating as a high priority event and the windows remaining open as a low priority event.

Classifying the first event as a high priority event and the second event as a low priority event can include assigning the first event to a first category of events and the second event to a second category of events. The system can access user-input data indicating a higher priority for the first category of events and a lower priority for the second category of events. The system can classify, based on the user-input data, the first event as a high priority event and the second event is a low priority event. For example, the system may assign the fire alarm activating to a fire-related category. The system may assign the windows remaining open to a security-related category. The system can access user-input data indicating a higher priority for fire-related events and a lower priority for security-related events. The system can thus classify, based on the user-input data, the fire alarm activating as a high priority event and the windows remaining open as a low priority event.

The process 400 includes determining that a mobile device is able to receive data from the monitoring system (410). Determining that a mobile device is able to receive data from the monitoring system can include determining that the mobile device is located within a particular geographic range to the property. For example, the system may receive GPS data indicating a GPS location of the smart phone 110. The monitoring system can determine that the smart phone 110 is able to receive data from the monitoring system based on determining that the GPS location of the smart phone 110 is located within a geographic range, e.g., 0.25 miles, of the property 102.

Determining that a mobile device is able to receive data from the monitoring system can include receiving a communication from the mobile device. For example, when the mobile device arrives at or near the property, the mobile device may connect to the monitoring system, e.g., through a Wi-Fi or Bluetooth connection. The mobile device may send data to and/or receive data from the monitoring system. Based on the mobile device communicating with the monitoring system, the monitoring system can determine that the mobile device is able to receive data from the monitoring system.

In an example, a visitor may bring a mobile device to the property. The mobile device can be, for example, a laptop computer, a tablet, a smart watch, a video game console, a smart car, or a smart phone, e.g., the smart phone 110. The mobile device may be located within a range of a local network of the monitoring system, e.g., the network 120. The mobile device may be able to receive data from the monitoring system, for example, through a Wi-Fi or Bluetooth connection. In some examples, the monitoring system can send a request to the mobile device to allow the mobile device to receive data.

The process can include determining that a plurality of mobile devices are able to receive data from the monitoring system. The system can providing, to each of the plurality of mobile devices, data related to the first event. For example, a visitor or group of visitors may bring several mobile devices to the property, e.g., two smart phones and a laptop. The system can determine that the two smart phones and the laptop are each within the range of the local network. The system can provide data related to the first event to each of the mobile devices. In some examples, the system may provide the same data to each of the mobile devices. In some examples, the system may provide different data to each of the mobile devices. For example, for image data from a camera, the system may provide a first subset of the image data to a first smart phone, a second subset of the image data to a second smart phone, and a third subset of the image data to the laptop. Each subset of the image data may include, for example, a portion of a video clip of an event that occurred at the property.

The process can include determining that no mobile device is able to receive data from the monitoring system. The system can provide, to a computer system of an unmanned vehicle, the data indicating the first event and an instruction to transmit the data indicating the first event to the server upon the unmanned vehicle being able to communicate with the outside network. The system can deploy the unmanned vehicle to a position where the unmanned vehicle is able to communicate with the outside network. For example, the drone 125 may be based at or near the property 102. The system may determine that no mobile device is able to receive data from the monitoring system, e.g., that no mobile device is within communication range to the property 102. The system can provide the data indicating the first event to the drone 125. The system can also provide, to the drone 125, the instruction to transmit the data indicating the first event to the monitoring server 126. The system can then deploy the drone 125 to the coverage area 128. Once the drone 125 is within the coverage area 128, the drone 125 can transmit the data indicating the first event to the monitoring server 126.

The process 400 includes providing, to the mobile device, data indicating the first event and instructions to transmit the data indicating the first event to a server upon the mobile device being able to communicate with an outside network (412). Providing, to the mobile device, the data indicating the first event can include determining an amount of data storage available in a memory of the mobile device. The system can provide, to the mobile device, an amount of data related to the first event that is less than the amount of data storage available in the memory. For example, the system may determine that the mobile device has 2.0 MB of data storage available, and permitted for use in storing data related to property events, in the memory of the mobile device. The system can provide, to the mobile device, an amount of data that is less than 2.0 MB. For example, the data related to the first event may include a fifteen-second video clip that has a data size of 3.0 MB. The system can provide, to the mobile device, a portion of the video clip, e.g., a ten-second portion of the video clip that has a data size of 2.0 MB or less.

After providing, to the mobile device, the data indicating the first event and the instruction to transmit the data indicating the first event, the system may provide, to the mobile device, data indicating the second event and an instruction to transmit the data indicating the second event to the server upon the mobile device being able to communicate with the outside network. For example, the data indicating the first event may include a notification that the fire alarm activated at 10:32 am on August 12, and ceased activating at 11:04 am on August 12. The data indicating the first event may have a data size, e.g., of 100 kB. After providing, to the mobile device, the data indicating the first event and the instruction to transmit the data indicating the first event, the system may determine that there is data storage available in the memory of the mobile device. The system can then provide, to the mobile device, the data indicating the second event and an instruction to transmit the data indicating the second event to the server upon the mobile device being able to communicate with the outside network. For example, the system can transmit, to the mobile device, a notification that the windows were open between August 10 and August 14, while the property 102 was unoccupied.

The operations can include sending, to the mobile device, a request to provide data to the mobile device. The system may receive, from the mobile device, permission to provide the data to the mobile device. In response to receiving permission to provide the data to the mobile device, the system can provide the data indicating the first event and the instruction to transmit the data indicating the first event to the server upon the mobile device being able to communicate with the outside network. In some examples, the request sent to the mobile device may include a prompt for a user of the mobile device. The request may prompt the user to select to allow or disallow data to be sent to the mobile device. In another example, the user of the mobile device may opt in to receiving the data on the mobile device, prior to the request being sent. For example, the user may be a visitor to the property 102. When scheduling the visit to the property, the user may be provided with an option to allow or disallow the mobile device to receive data from the monitoring system. The user may select to allow the mobile device to receive the data. Upon arrival of the mobile device at the property 102, the system can send, to the mobile device, the request to provide the data to the mobile device. The mobile device can grant permission to provide the data to the mobile device based on the previous approval by the user. In some examples, the user may provide user input indicating an amount of data that is permitted to be transmitted to the mobile device.

In some examples, the operations include not providing, to the mobile device, data indicating the second event. For example, after providing, to the mobile device, the data indicating the first event and the instruction to transmit the data indicating the first event, the system may determine that there is not enough data storage available in the memory of the mobile device to store the data indicating the second event. For example, the data storage available in the memory of the mobile device may be 300 kB, and the data indicating the second event may be 400 kB. The system can thus determine not to provide, to the mobile device, the data indicating the second event.

In some examples, the operations include receiving, from an unmanned vehicle, data indicating a third event and a fourth event that have occurred at a nearby property. For example, a third event may be a water leak from a pipe at a neighboring property, and a fourth event may be a broken window at the neighboring property. The neighboring property may be unable to communicate with an outside network. For example, the neighboring property may be in a remote location and may be unoccupied. Sensors at the neighboring property may detect the water leak and the broken window, and may provide data indicating the water leak and indicating the broken window to an unmanned vehicle, e.g., the drone 125. A monitoring system of the neighboring property can then deploy the drone 125 to the property 102. The monitoring system can then receive, from the drone 125, the data indicating the water leak and the broken window. The operations can include determining that the monitoring system of the property 102 is not able to communicate with an outside network. Based on determining that the monitoring system is not able to communicate with the outside network, the system can classify the third event as a high priority event and the fourth event as a low priority event. For example, the monitoring system can classify the water leak as a high priority event and the broken window as a low priority event. The system can determine that a mobile device, e.g., the smart phone 110, is able to receive data from the monitoring system. The system can provide, to the mobile device, data indicating the third event and an instruction to transmit the data indicating the third event to a server upon the mobile device being able to communicate with the outside network. In this way, data indicating the third event, e.g., the water leak, can be provided to the monitoring system by the unmanned vehicle, and can be provided to the server by the mobile device.

When the mobile device is able to communicate with the outside network, the mobile device can transmit the data indicating the first event to the server through the outside network. The server can be, for example, the monitoring server 126. The mobile device may be able to communicate with the outside network when in a coverage area, e.g., the coverage area 128, that is within a range of one or more cellular towers, e.g., the cellular tower 124. The mobile device may transmit the data to the server through a long-range data link such as a broadband internet connection.

In some examples, the operations include receiving, from the mobile device, additional data received from the server while the mobile device was able to communicate with an outside network. The monitoring system can receive the additional data from the mobile device, e.g., through the local network at the property.

In some examples, the additional data includes instructions to reconfigure one or more devices at the property. For example, while the mobile device was able to communicate with the outside network, the mobile device may have received additional data from the server related to user commands, e.g., the user commands 230, for configuring and controlling the monitoring system. The user commands can include, for example, a command to automatically lock the front door of the property 102 every day after 11:00 pm, or a command to raise the thermostat setting during the daytime from seventy-two degrees to seventy-four degrees. While the mobile device was able to communicate with the outside network, the mobile device may have received additional data including monitoring system software updates from the server. The monitoring system can receive the additional data including the software updates, and can implement the updates upon receiving the updates from the mobile device.

In some examples, the additional data includes data representing a schedule for a future visitor to the property. In response to receiving the data representing the schedule for the future visitor to the property, the system can configure one or more devices at the property based on the schedule. For example, the mobile device may have received rental reservation data, e.g., the rental reservation data 216, from the server. The rental reservation data 216 may indicate that the future visitor is scheduled to arrive at 9:00 am on September 4. In response to receiving the rental reservation data 216, the system can configure devices based on the expected arrival time of the visitor. For example, the system may set an access code to the property 102 on September 4 at 8:00 am that is specific to the visitor. In another example, the system may open a water valve of a water inlet pipe on September 3, thereby allowing water to flow to the property in advance of the arrival of the visitor, and may adjust a thermostat at the property, heating the property in advance of the arrival.

The operations can include determining that the future visitor has not arrived at the property as scheduled. Determining that the future visitor has not arrived at the property as scheduled can include determining that a scheduled time of arrival has passed and that the future visitor has not arrived at the property. The system may determine that the future visitor has not arrived based on sensor data. For example, the system may determine, based on GPS data and/or geofencing data, that a mobile device associated with the future visitor is not within a particular geographic range to the property. In some examples, the system can determine that the future visitor has not arrived based on the user not yet inputting the access code to access the property. The system can also determine that the future visitor has not arrived based on, for example, motion sensor data indicating no motion within the property 102, door sensor data indicating that no door to the property 102 has opened, and light sensor data indicating no lights illuminated at the property 102.

In response to determining that the future visitor has not arrived at the property as scheduled, the system can reconfigure the one or more devices at the property. For example, the future visitor's scheduled arrival time may be 9:00 am on September 4. At 12:00 am on September 5, the system may determine that the future visitor has not yet arrived at the property 102. In response to determining that the future visitor has not arrived at the property 102 as scheduled, the system can reconfigure one or more devices, e.g., by shutting the water valve of the water inlet pipe, thereby ceasing water flow to the property. In another example, in response to determining that the visitor has not yet arrived, the system can adjust a thermostat at the property to reduce the amount of energy consumed by the heating and cooling system while the property is unoccupied.

Figure 5:
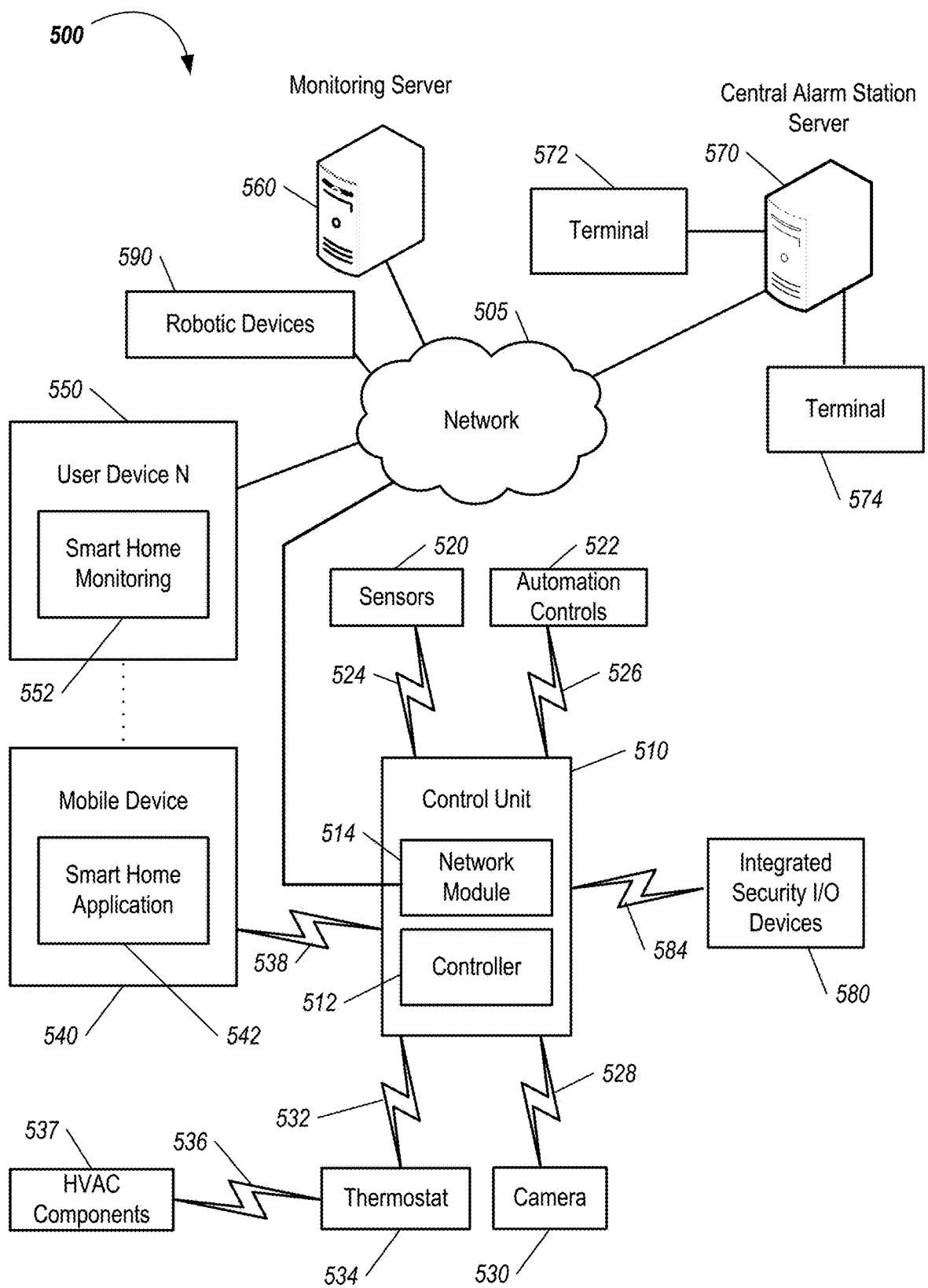
FIG. 5 is a diagram illustrating an example of a property monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

In addition, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., owner 112). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and the robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system for monitoring a property, the monitoring system comprising one or more processors and one or more computer storage media storing instructions that are operable, when executed by the one or more processors, to cause the one or more processors to perform operations comprising:
  receiving sensor data from a sensor of the property;
  based on the sensor data, determining a first event and a second event that have occurred at the property;
  determining that the monitoring system is not able to communicate with an outside network;
  based on determining that the monitoring system is not able to communicate with the outside network, classifying the first event as a high priority event and the second event as a low priority event;
  determining that a mobile device is able to receive data from the monitoring system; and
  providing, to the mobile device, data indicating the first event and an instruction to transmit the data indicating the first event to a server upon the mobile device being able to communicate with the outside network.

2. The monitoring system of claim 1, the operations comprising receiving, from the mobile device, additional data received from the server while the mobile device was able to communicate with the outside network.

3. The monitoring system of claim 1, wherein providing, to the mobile device, the data indicating the first event comprises:
  determining an amount of data storage available in a memory of the mobile device; and
  providing, to the mobile device, an amount of data related to the first event that is less than the amount of data storage available in the memory.

4. The monitoring system of claim 1, the operations comprising:
  after providing, to the mobile device, the data indicating the first event and the instruction to transmit the data indicating the first event, providing, to the mobile device, data indicating the second event and an instruction to transmit the data indicating the second event to the server upon the mobile device being able to communicate with the outside network.

5. The monitoring system of claim 1, the operations comprising:
  not providing, to the mobile device, data indicating the second event.

6. The monitoring system of claim 1, the operations comprising:
  determining that a plurality of mobile devices are able to receive data from the monitoring system; and
  providing, to each of the plurality of mobile devices, data related to the first event.

7. The monitoring system of claim 1, the operations comprising:
  sending, to the mobile device, a request to provide data to the mobile device;
  receiving, from the mobile device, permission to provide the data to the mobile device; and
  in response to receiving permission to provide the data to the mobile device, providing the data indicating the first event and the instruction to transmit the data indicating the first event to the server upon the mobile device being able to communicate with the outside network.

8. The monitoring system of claim 1, the operations comprising:
  determining that no mobile device is able to receive data from the monitoring system;
  providing, to a computer system of an unmanned vehicle, the data indicating the first event and an instruction to transmit the data indicating the first event to the server upon the unmanned vehicle being able to communicate with the outside network; and
  deploying the unmanned vehicle to a position where the unmanned vehicle is able to communicate with the outside network.

9. The monitoring system of claim 1, the operations comprising:
  receiving, from an unmanned vehicle, data indicating a third event and a fourth event that have occurred at a nearby property;
  determining that the monitoring system is not able to communicate with an outside network;
  based on determining that the monitoring system is not able to communicate with the outside network, classifying the third event as a high priority event and the fourth event as a low priority event;
  determining that a mobile device is able to receive data from the monitoring system; and
  providing, to the mobile device, data indicating the third event and an instruction to transmit the data indicating the third event to a server upon the mobile device being able to communicate with the outside network.

10. The monitoring system of claim 2, wherein the additional data comprises data representing a schedule for a future visitor to the property.

11. The monitoring system of claim 10, the operations comprising:
  in response to receiving the data representing the schedule for the future visitor to the property, configuring one or more devices at the property based on the schedule.

12. The monitoring system of claim 11, the operations comprising:
  determining that the future visitor has not arrived at the property as scheduled; and
  in response to determining that the future visitor has not arrived at the property as scheduled, reconfiguring the one or more devices at the property.

13. The monitoring system of claim 12, wherein determining that the future visitor has not arrived at the property as scheduled comprises:
  determining that a scheduled time of arrival has passed; and
  determining that a mobile device associated with the future visitor is not within a particular geographic range to the property.

14. The monitoring system of claim 1, wherein classifying the first event as a high priority event and the second event as a low priority event comprises:
  determining that a risk of damage to the property associated with the first event is greater than the risk of damage to the property associated with the second event; and
  based on determining that the risk of damage to the property associated with the first event is greater than the risk of damage to the property associated with the second event, classifying the first event as a high priority event and the second event as a low priority event.

15. The monitoring system of claim 1, wherein classifying the first event as a high priority event and the second event as a low priority event comprises:
  assigning the first event to a first category of events and the second event to a second category of events;

accessing user-input data indicating a higher priority for the first category of events and a lower priority for the second category of events; and classifying, based on the user-input data, the first event as a high priority event and the second event is a low priority event.

16. The monitoring system of claim 1, wherein the outside network comprises a broadband or cellular network.

17. The monitoring system of claim 2, wherein the additional data comprises instructions to reconfigure one or more devices at the property.

18. The monitoring system of claim 1, wherein determining that a mobile device is able to receive data from the monitoring system comprises determining that the mobile device is located within a particular geographic range to the property.

19. A method, comprising:

receiving sensor data from a sensor of a property monitored by a monitoring system;

based on the sensor data, determining a first event and a second event that have occurred at the property;

determining that the monitoring system is not able to communicate with an outside network;

based on determining that the monitoring system is not able to communicate with the outside network, classifying the first event as a high priority event and the second event as a low priority event;

determining that a mobile device is able to receive data from the monitoring system; and providing, to the mobile device, data indicating the first event and an instruction to transmit the data indicating the first event to a server upon the mobile device being able to communicate with the outside network.

20. A non-transitory computer-readable medium storing software comprising instructions executable by one or more computers which, upon such execution, cause the one or more computers to perform operations comprising:

receiving sensor data from a sensor of a property monitored by a monitoring system;

based on the sensor data, determining a first event and a second event that have occurred at the property;

determining that the monitoring system is not able to communicate with an outside network;

based on determining that the monitoring system is not able to communicate with the outside network, classifying the first event as a high priority event and the second event as a low priority event;

determining that a mobile device is able to receive data from the monitoring system; and providing, to the mobile device, data indicating the first event and an instruction to transmit the data indicating the first event to a server upon the mobile device being able to communicate with the outside network.

* * * * *